Figures 1, 2, 3, 4, 5, 6:
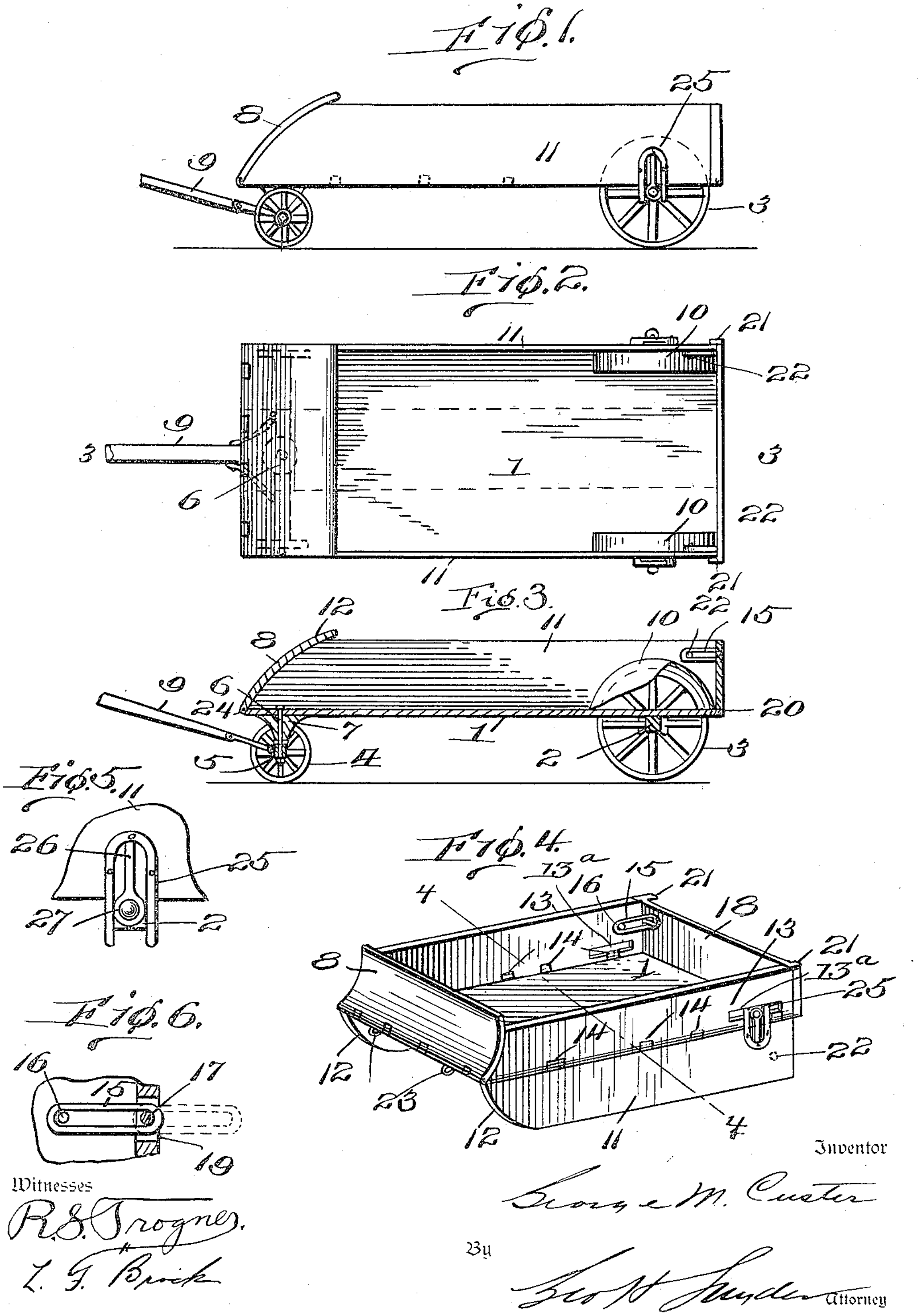

G. M. CUSTER.

CONVERTIBLE VEHICLE.

APPLICATION FILED MAY 20, 1911.

1,075,336. Patented Oct. 14, 1913.

2 SHEETS—SHEET 1.

Witnesses

R. S. Trogner.

L. G. Brick

Inventor

George M. Custer

By

Geo. H. Snyder Attorney

G. M. CUSTER.
CONVERTIBLE VEHICLE.
APPLICATION FILED MAY 20, 1911.
1,075,336. Patented Oct. 14, 1913.
2 SHEETS—SHEET 2.
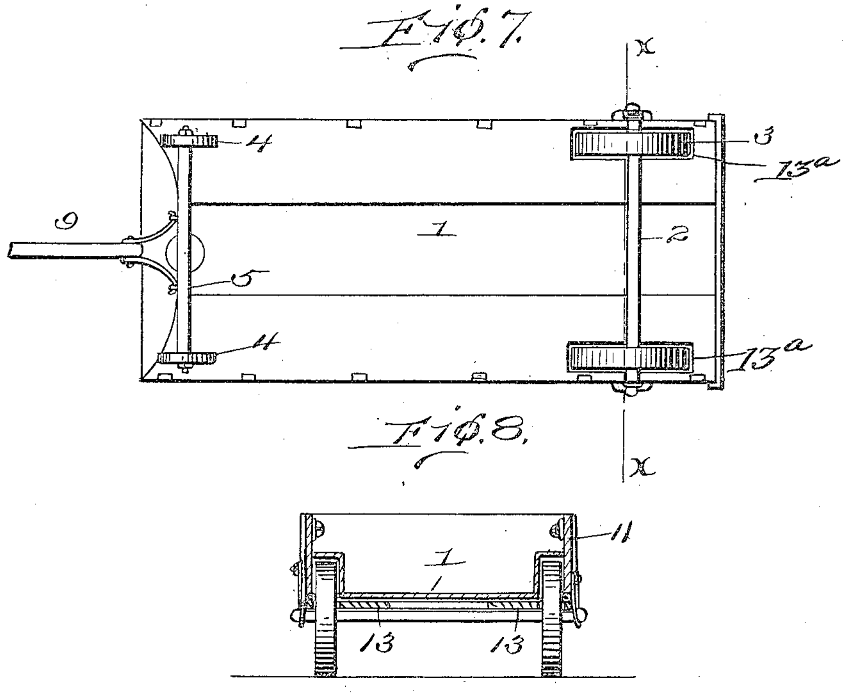
FIG. 7, FIG. 8
FIG. 9
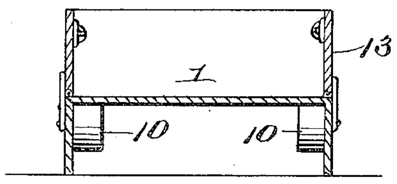
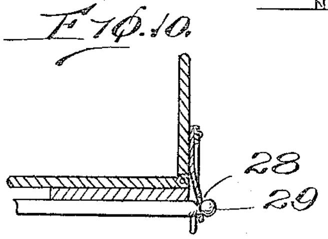
FIG. 10
FIG. 11
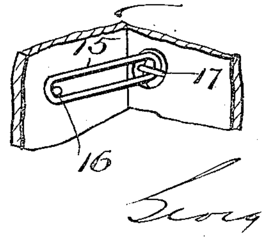
Inventor
Witnesses
J. M. Fowler Jr.
L. F. Brook
George M. Custer
By
Geo. H. Snyder
Attorney
COLUMBIA PLANOGRAPH CO., WASHINGTON, D. C.

UNITED STATES PATENT OFFICE.

GEORGE M. CUSTER, OF MATTOON, ILLINOIS.

CONVERTIBLE VEHICLE.

1,075,336. Specification of Letters Patent. Patented Oct. 14, 1913.

Application filed May 20, 1911. Serial No. 628,417.

*To all whom it may concern:*

Be it known that I, GEORGE M. CUSTER, a citizen of the United States, residing at Mattoon, in the county of Coles and State of Illinois, have invented certain new and useful Improvements in Convertible Vehicles, of which the following is a specification.

This invention relates to certain new and useful improvements in convertible vehicles of that class comprising a wheeled vehicle and a vehicle adapted for use on snow or ice, upon runners.

The present invention has for its objects among others to provide a simple and cheap vehicle of this character quickly and easily changed from one to the other, in which the dash serves for both vehicles as does also the tail-gate, and also to provide simple and efficient means for locking the gate in position with whichever style of vehicle it may be employed.

It has for a further object to provide simple and improved efficient means for holding the rear axle in place to prevent loss thereof when the rear wheels are removed and the device used as a sleigh or sled.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1 is a side elevation showing the device as arranged for a wheeled vehicle. Fig. 2 is a top plan thereof. Fig. 3 is a substantially central longitudinal vertical section with a portion broken away. Fig. 4 is a perspective view of the device converted into a sleigh or sled. Fig. 5 is an enlarged detail in elevation showing the means for preventing loss of the axle. Fig. 6 is an enlarged sectional elevation showing the tail-gate holding link. Fig. 7 is a bottom plan of Fig. 1. Fig. 8 is a vertical cross section as on the line *x*—*x* of Fig. 7. Fig. 9 is a vertical cross section as on the line 4—4 of Fig. 4. Fig. 10 is an enlarged sectional detail showing the spring for holding the rear axle. Fig. 11 is a perspective detail showing the tail-gate holding link in operative position.

Like numerals of reference indicate like parts throughout the several views.

Referring to the drawings, 1 designates the bottom which serves as such for both vehicles, whether a wagon or a sleigh. This bottom may be secured to the axle 2 in any suitable manner, preferably by the means hereinafter described.

3 are the rear wheels of known construction.

4 are the front wheels carried by the front axle 5 which is mounted to turn upon the vertical bolt or pin 6 passed through the bolster 7.

8 is the front dash. It is of curved contour, as shown, and when the device is set up as a wagon, it is arranged with its convex surface outward, as seen in Figs. 1 and 3, but when used as a sleigh or sled, this front dash is reversed so that its concave side is outermost, as seen in Fig. 4, in which latter view the device is shown set up as a sleigh. Any suitable pulling means, as a shaft or pole 9, may be employed, suitably connected with the front axle. The rear wheels are preferably arranged so as to extend within the body and are provided within such body with guards or shields 10 of any suitable form of construction.

11 are what constitute the sides of the vehicle when used as a wagon, as seen in Figs. 1, 2 and 3. Their forward ends are rounded, as shown at 12, and when used as a wagon, the front dash 8 conforms to the curvature of such forward ends. When used as a sleigh, these sides 11 constitute the runners, as will be clearly understood upon reference to Fig. 4.

13 are side boards hinged to the opposite edges of the bottom 1, as seen best in Fig. 4, by suitable hinges or the like 14. When the device is used as a sleigh, as seen in Fig. 4, these side boards are turned upward so as to constitute the sides of the sleigh, being in vertical alinement with the side boards 11 which, when used as a sleigh, constitute the runners, as above described. When used as a wagon, these side boards 13 lie flat against the under side of the bottom 1, as seen clearly in Fig. 8, and the rear wheels pass through the slots or cut away portions 13ª of the side boards of the sled body as best seen in Figs. 4 and 7.

In order to hold the side boards 13 in their vertical position, as seen in Fig. 4, I provide suitable means which, in this instance, consist of links 15 adapted to engage pins or the like 16 on the inner faces of the side boards 13, as seen clearly in Fig. 4. These links engage pins 17 held in the tail-gate 18 and are endwise slidable through slots 19 therein, as will be clearly understood upon reference to Fig. 6. The tail-gate is pivoted, as at 20, see Fig. 3. It is provided at opposite ends with the flanges 21 which, when the device is set up as a wagon, engage the outer opposite sides of the side boards 11. When the device is set up as a sleigh, the position of this tail-gate is reversed, as will be clearly understood upon reference to Fig. 4. When the device is converted from one vehicle into the other and the position of the tail-gate 18 reversed, these links 15 are moved in the corresponding direction through the slots 19 and made engageable with the pins 16 on the side boards 13 and when in the reverse direction, they are engaged with pins 22 on the inner faces of the side boards 11, as seen in Fig. 2. The forward end of the bottom is provided with eyes or the like 23, as seen in Fig. 4, for the attachment of a tongue or pole when the device is used as a sleigh.

It is to be understood that when the device is changed from a wagon, as seen in Figs. 1, 2 and 3, to a sleigh, as seen in Fig. 4, the wheels are removed, the guards 10 remaining in position, being then upon the under side of the bottom, as seen in Fig. 9. The side boards 13 are then turned up and the device inverted so that the side boards 11 are lowermost, constituting the runners of the sleigh, as indicated in Fig. 4. The dash 8 is reversed in position upon its pivot 24, from the position seen in Fig. 3 to that shown in Fig. 4. The links 15 are engaged with the pins 16 and when the tongue is applied, the device is ready for use as a sleigh.

In order to retain the rear axle 2 in position, I provide the inverted U-shaped metallic members 25 which are secured to the sides 11 and between the parallel members thereof, the squared rear axle 2 is received. 26 is a spring affixed at its upper end to the side 11 and having at its lower end an enlargement 27 having an opening 28 designed to engage over a knob or ball or the like 29 on the end of the axle. The parallel members of the U-shaped part 25 serve to prevent the lateral movement of the axle and the engagement of the opening in the end of the spring over the end of the axle serves to prevent vertical displacement thereof. This spring is readily disengaged from the end of the axle when it is desired to remove the latter and is easily engaged over the same when the axle is replaced. It is to be understood, of course, that there are two of these springs, one at each end of the axle.

When used as a sleigh, as seen in Fig. 4, the members 25 serve to brace the side members 13, the said members 25 extending beyond the adjacent edges of the sides 11.

Modifications in detail may be resorted to without departing from the spirit of the invention or sacrificing any of its advantages.

What is claimed as new is:—

1. A vehicle body having a bottom, fixed side members rising therefrom and hinged side members adapted to fold against the under side of the bottom or into vertical alinement with the fixed side members.

2. A vehicle body having side members with curved front ends and a concavo-convex dash pivotally mounted for coöperation therewith.

3. A vehicle body comprising a bottom, rigid side members rising therefrom and having curved forward ends, a concavo-convex hinged dash and a reversibly mounted tail-gate.

4. A vehicle body comprising a bottom, rigid side members rising therefrom and having curved forward ends, a concavo-convex hinged dash, a reversibly mounted tail-gate, and means for holding the latter in either of its positions.

5. A vehicle body comprising a bottom, rigid side members rising therefrom, a hinged dash, a hinged tail-gate and hinged side members adapted to be thrown into vertical alinement with the first-named side members.

6. A vehicle body having fixed and hinged side members, and a reversible tail-gate provided with means adapted to serve with either the fixed or hinged side members.

7. A vehicle body having fixed and hinged side members, a reversible tail-gate provided with means adapted to serve with either the fixed or hinged side members, said means being mounted to slide through the tail-gate.

8. A vehicle body having a bottom, fixed sides, hinged sides, a reversibly mounted tail-gate, fixed pins on the hinged and fixed sides, and links carried by the tail gate and endwise movable therethrough for coöperation with said pins.

9. In a convertible vehicle, a removable axle, parallel guide members on the sides of the body between which the ends of the axle are received, and springs mounted on said sides and having openings to engage over the ends of the axle.

In testimony whereof I affix my signature in presence of two witnesses.

GEORGE M. CUSTER.

Witnesses:
N. CURTIS LAMMOND,
GEORGE H. SNYDER.

Copies of this patent may be obtained for five cents each, by addressing the "Commissioner of Patents, Washington, D. C."